United States Patent [19]

Kobayashi et al.

[11] Patent Number: 5,344,128
[45] Date of Patent: Sep. 6, 1994

[54] SELF-EXPANDING MOUNT

[75] Inventors: Toshiaki Kobayashi; Koji Okazaki; Masaki Ueyama; Susumu Toki, all of Wako, Japan

[73] Assignee: Honda Giken Kogyo Kabushiki Kaisha, Tokyo, Japan

[21] Appl. No.: 958,232

[22] Filed: Oct. 8, 1992

[30] Foreign Application Priority Data

Oct. 9, 1991 [JP] Japan .................................. 3-290639
Oct. 9, 1991 [JP] Japan .................................. 3-290640

[51] Int. Cl.5 ............................................. B60K 5/12
[52] U.S. Cl. ................................. 267/140.14; 267/219
[58] Field of Search .............. 267/35, 140.11, 140.13, 267/140.14, 140.15, 140.2, 141.6, 122, 123, 218, 219; 188/298; 180/300, 312, 902; 248/631, 638, 636, 562

[56] References Cited

U.S. PATENT DOCUMENTS

| 4,531,484 | 7/1985 | Kimura et al. ................ 267/35 X |
| 4,638,983 | 1/1987 | Idigkeit et al. ................ 267/140.14 |
| 4,693,455 | 9/1987 | Andrä ......................... 267/140.14 |
| 4,793,600 | 12/1988 | Kojima ......................... 267/140.14 |
| 4,877,225 | 10/1989 | Noguchi et al. ................ 248/562 X |
| 5,116,029 | 5/1992 | Gennesseaux ................ 267/219 X |

FOREIGN PATENT DOCUMENTS

| 081085 | 6/1983 | European Pat. Off. . |
| 0163162 | 12/1985 | European Pat. Off. . |
| 0440536 | 8/1991 | European Pat. Off. . |
| 0464598 | 1/1992 | European Pat. Off. . |
| 0071220 | 4/1983 | Japan ............................. 180/312 |
| 59-1829 | 1/1984 | Japan . |
| 60-8540 | 1/1985 | Japan . |
| 0118134 | 5/1987 | Japan ............................. 267/219 |
| 0127539 | 6/1987 | Japan ............................. 267/219 |
| 4157228 | 5/1992 | Japan ............................. 267/140.13 |

Primary Examiner—Robert J. Oberleitner
Assistant Examiner—Josie A. Ballato
Attorney, Agent, or Firm—Lyon & Lyon

[57] ABSTRACT

A self-expanding mount controls transmission of vibration of a vibration source to a base. A main liquid chamber is defined between a resilient member fixed to the vibration source or the base and a casing fixed to the base or the vibration source. A metallic bellows is driven in response to a control signal corresponding to vibration of the vibration source, cause a variation in the pressure of liquid within the main liquid chamber. This variation in the liquid pressure causes contraction and expansion of the resilient member to thereby control the transmission of vibration of the vibration source to the base. A cylinder is formed in the casing and defines part of the main liquid chamber. A driven member is received in the cylinder for axial displacement therein in response to the above control signal. The driven member may be a bellows or a piston.

17 Claims, 9 Drawing Sheets

SELF-EXPANDING MOUNT

BACKGROUND OF THE INVENTION

1. Field of the Invention

This invention relates to a self-expanding mount for supporting a vibration source, such as an engine, on a base such as a chassis of a vehicle, and more particularly to a self-expanding mount of this kind, which has a liquid chamber filled with liquid, the pressure of which is varied in response to vibration transmitted from the vibration source to cause contraction and expansion of a resilient member thereof fixed to the vibration source, to thereby control transmission of the vibration to the base.

2. Prior Art

Conventionally, self-expanding mounts of this kind, which are so-called active mounts, have been proposed e.g. by Japanese Provisional Patent Publication (Kokai) No. 60-8540 and U.S. Pat. No. 4,638,983.

The former discloses a vibration-absorbing device comprising a fluid chamber provided between a vibrating body or engine and a vibrated body or a chassis of a vehicle, which is filled with fluid and adapted to expand and contract in response to vibration transmitted from the vibrating body, and pulsating pressure-generating means which imparts pulsating pressure to the fluid within the fluid chamber in opposite phase to a pulsation caused by the vibration transmitted from the vibrating body to thereby prevent transmission of vibration from the vibrating body to the vibrated body, wherein the pulsating pressure-generating means is comprised of a vibrating element which is formed of a generally flat plate made of a magnetic material and forming part of walls defining the fluid chamber, the vibrating element being capable of vibrating to thereby impart pulsation to the fluid within the fluid chamber, and a pair of solenoids which, when energized, cause vibration of the vibrating element. In the proposed vibration-absorbing device, the vibrating element in the form of a generally flat plate is vertically vibrated by an electromagnetic force generated by the solenoids to impart vibration to the fluid within the fluid chamber in opposite phase to pulsation caused by vibration of the engine, to thereby prevent the vibration of the engine from being transmitted to the chassis.

The latter discloses an apparatus for the resilient mounting of a vibrating body, including a mounting bracket and a pedestal which are interconnected through a resilient element that contains a liquid-filled hollow space (main liquid chamber), a compensating baffle associated with a positioning element being provided whose adjustment permits compensation of the pressure variations in the liquid caused by disturbing vibrations, wherein the compensating baffle faces the liquid-filled space, the positioning element is adapted to be actuated by a primary element which detects disturbing vibrations of the vibrating body, and the primary element and the positioning element are interconnected through a freely programmable control unit. Further, an equalizing space (auxiliary liquid chamber) is connected to the working space or liquid-filled space through a throttle opening. According to this prior art, when the liquid-filled space is compressed by downward movement of the engine, for example, the compensating baffle is displaced upward to thereby prevent vibration of the engine from being transmitted to the chassis or frame of a vehicle.

Thus, according to the prior art devices described above, the vibrating element or the compensating baffle as a driven member is displaced in an oscillating manner within the liquid chamber to vary liquid pressure within the liquid chamber, which causes expansion and contraction of the resilient member defining the liquid chamber and fixed to the engine to thereby prevent the vibration of the engine from being transmitted to the chassis.

In the former prior art, the vibrating element in the form of a generally flat plate is disposed to be reciprocally displaced within a space between the two solenoids which are arranged at opposite ends of the vibrating element. However, the distance between the solenoids should be short in view of the fact that the output from the solenoids, i.e. the driving force for vibrating the vibrating element is inversely proportionate to the square of the distance between the solenoids. Therefore, the amount of displacement of the vibrating element cannot be set to a large value. Consequently, the fluid pressure within the fluid chamber cannot be varied with a large amplitude and hence the resilient member fixed to the engine cannot be contracted and expanded with a large amplitude. Thus, according to this prior art, low frequency engine vibration components, which are large in amplitude, cannot be accurately and effectively controlled.

On the other hand, in the latter prior art, the compensating baffle associated with the positioning element is supported, via a resilient rubber membrane which seals against the liquid-filled hollow space, in a core fitted in a central portion of the resilient element disposed on the engine side. Therefore, to obtain large displacement of the compensating baffle, the resilient rubber membrance has to be large in surface area. However, if such a rubber membrance with a large surface area is used, a variation in the liquid pressure caused by displacement of the compensating baffle is absorbed by the rubber membrance which is more flexible than the resilient element. Therefore, the rubber membrance should have a smaller surface area, which results in smaller displacement of the compensating baffle. Accordingly, a large amplitude of variation in the liquid pressure within the hollow space cannot be obtained, and hence the resilient element cannot be contracted and expanded with a large amplitude. Thus, also this prior art cannot accurately and effectively control low frequency vibrations of the engine, which are large in amplitude.

SUMMARY OF THE INVENTION

It is an object of the invention to provide a self-expanding mount which is capable of accurately and effectively controlling vibrations of an engine in a low frequency region, which are large in amplitude.

It is a further object of the invention to provide a self-expanding mount which is capable of preventing excessive changes in the pressure within the main liquid chamber, to thereby protect component parts such as a driven member and driving means therefor.

It is another object of the invention to provide a self-expanding mount which has a simple construction, a reduced member of component parts, and a low manufacturing cost, as well as improved mountability onto a base.

To attain the above objects, the present invention provides a self-expanding mount for controlling transmission of vibration of a vibration source to a base, including a resilient member fixed to one of the vibration source and the base, a casing fixed to the other of the vibration source and the base, a main liquid chamber defined between the resilient member and the casing and filled with liquid, liquid pressure-changing means for changing pressure of the liquid within the main liquid chamber in response to a control signal corresponding to vibration of the vibration source, an auxiliary liquid chamber, and a communication passage having a restriction and communicating the auxiliary liquid chamber with the main liquid chamber, wherein a variation in pressure of the liquid is caused by the liquid pressure-changing means to cause contraction and expansion of the resilient member to thereby control the transmission of vibration from the vibration source to the base.

The self-expanding mount according to the invention is characterized by an improvement wherein the liquid pressure-changing means comprises a cylinder formed in the casing and defining part of the main liquid chamber, a driven member received in the cylinder for axial displacement therein, and electromagnetic driving means for driving the driven member.

In a preferred embodiment of the invention, the electromagnetic driving means comprises a permanent magnet arranged below the casing, a driving element disposed in an magnetic field formed by the permanent magnet and displaceable axially of the cylinder, a coil wound on the driving element and disposed to be supplied with the control signal corresponding to vibration of the vibration source, and a transmitting member disposed to transmit displacement of the driving element to the driven member.

Advantageously, the driven member comprises a bellows.

Preferably, the bellows has an axial size substantially larger than a diametric size thereof.

Alternatively, the driven member comprises a piston.

Preferably, the self-expanding mount includes pressure-relieving means for allowing liquid from one of the main liquid chamber and the auxiliary liquid chamber to the other when an excessive change occurs in the pressure of liquid within the main liquid chamber.

In another preferred embodiment of the invention, the driven member of the liquid pressure-changing means comprises a piston slidably received in the cylinder, the electromagnetic driving means being arranged within the casing for causing oscillating displacement of the piston in an axial direction of the cylinder in response to vibration of the vibration source.

In this preferred embodiment, preferably, the cylinder has an inner peripheral surface, the electromagnetic driving means comprising a permanent magnet arranged in the inner peripheral surface of the cylinder, and a coil wound on a portion of the piston located within a magnetic field formed by the permanent magnet, the coil being disposed to be supplied with the control signal corresponding to vibration of the vibration source.

Preferably, the casing has a cylindrical portion located in the cylinder at a side remote from the main liquid chamber, the cylindrical portion having such a size and arrangement that an annular space is defined between an outer peripheral surface of the cylindrical portion and an inner peripheral surface of the cylinder, the annular space having a closed end, and another end communicating with a space defined within the cylinder and forming part of the main liquid chamber, the portion of the piston having the coil wound thereon being received in the annular space.

The above and other objects, features, and advantages of the invention will become more apparent from the ensuing detailed description taken in conjunction with the accompanying drawings.

DETAILED DESCRIPTION

Figure 1:
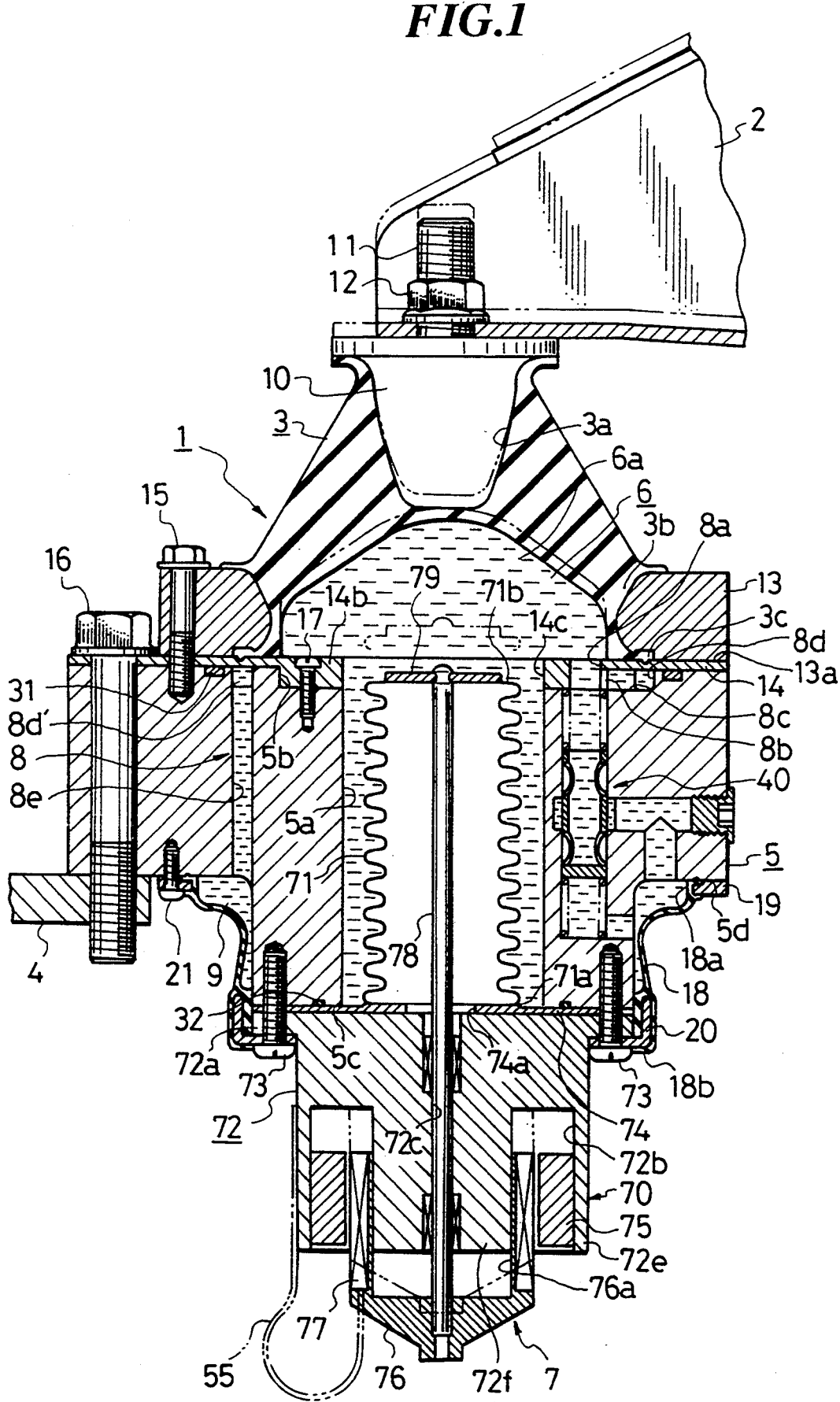
FIG. 1 is a longitudinal cross-sectional view showing a self-expanding mount for an engine, according to a first embodiment of the invention.

The invention will now be described with reference to the drawings showing embodiments thereof.

In the figures, parts or elements corresponding or similar to each other are designated by the same reference numeral.

FIG. 1 shows a self-expanding engine mount (self-expanding mount) according to a first embodiment of the invention.

Figure 6:
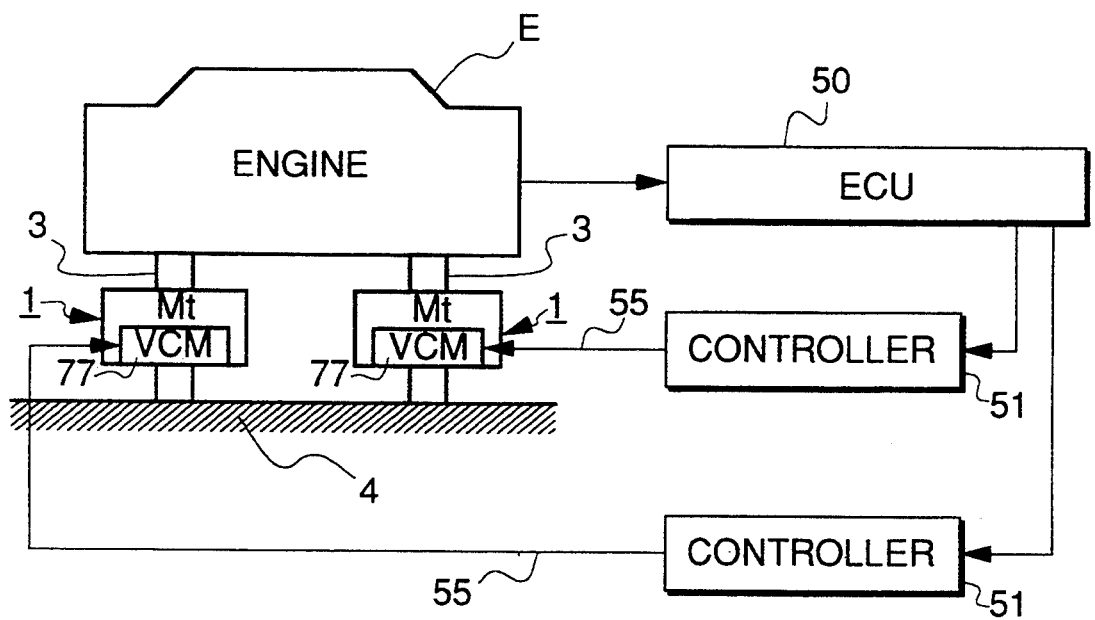
FIG. 6 is a schematic diagram showing the arrangement of a control system for the engine mount of FIG. 1.

The self-expanding engine mount 1 is comprised of a resilient rubber member (resilient member) 3 fixed to a bracket 2 on the engine side, a casing 5 arranged on the side of a chassis frame (base) 4, a main liquid chamber 6 defined between the resilient rubber member 3 and the casing 5 and filled with a liquid (an incompressible fluid such as an antifreeze), liquid pressure-changing means 7 responsive to a control signal supplied from external control means, which is comprised of an electronic control unit (ECU) 50, etc., shown in FIG. 6, hereinafter referred to, and which generates the signal in response to the vibration of the engine (the vibration source), for changing the pressure of the liquid within the main liquid chamber 6, and an auxiliary liquid chamber 9 communicating with the main liquid chamber 6 via a restriction passage 8.

Figure 2:
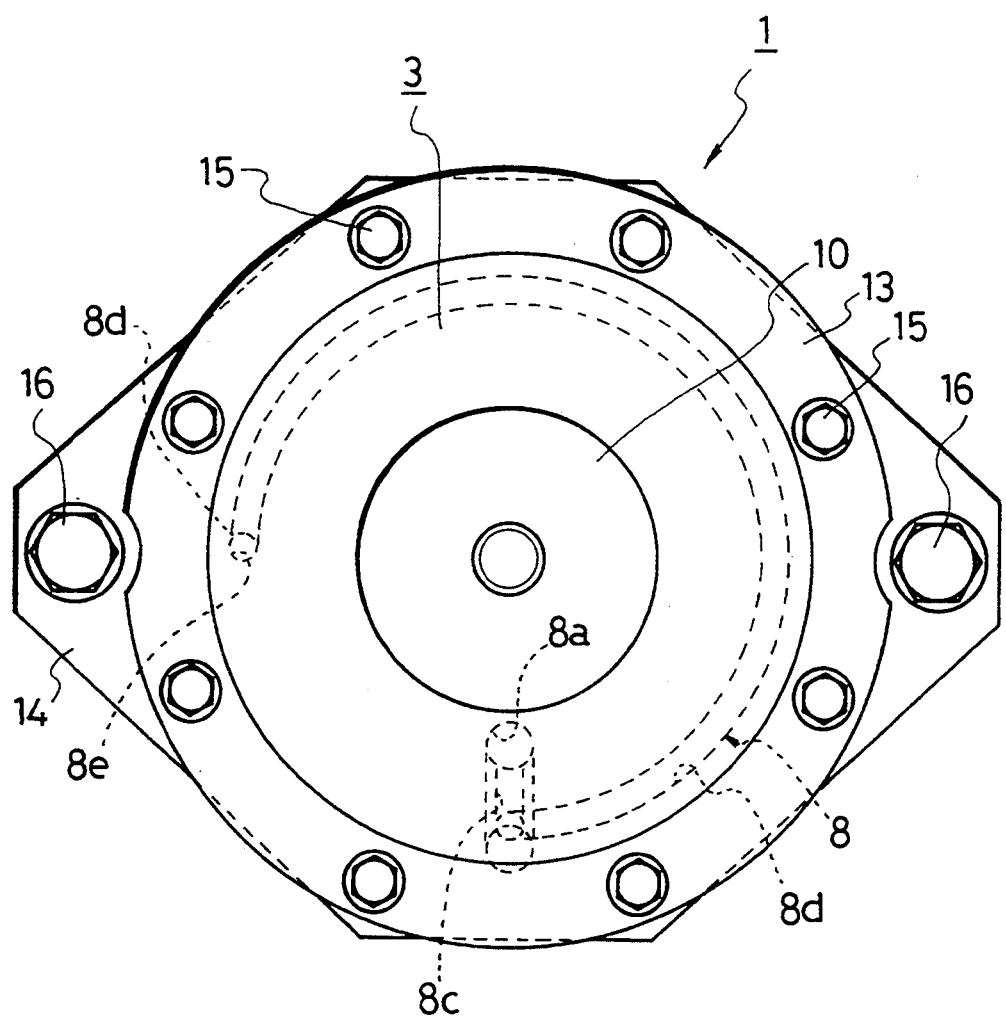
FIG. 2 is a top plan view of the engine mount of FIG. 1.

As shown in FIGS. 1 and 2, the resilient rubber member 3 has a circular section, and has a recess 3a formed in an upper end surface of a central portion thereof. The recess 3a receives a fixture member 10 secured thereto. The fixture member 10 is fastened to the bracket 2 by means of a bolt 11 and a nut 12, thus fixing the central portion of the resilient rubber member 3 to the bracket 2 on the engine side. The resilient rubber member 3 has an outer periphery 3b secured to an inner peripheral surface of a holding member 13. The outer periphery 3b of the rubber member 3 has a lower end peripheral edge 3c sandwiched between an inner lower end of the holding member 13 and a partition plate 14 disposed on the top of the casing 5. The holding member 13 is fixed to the casing 5 via the partition member 14 by means of bolts 15. The partition plate 14 is also fixed to the chassis frame 4 together with the casing 5 by means of bolts 16. Thus, the resilient rubber member 3 is supportedly held between the bracket 2 and the casing 5 fixed to the chassis frame 4, defining an upper space 6a forming part of the main liquid chamber 6.

As shown in FIG. 1, the casing 5 is formed therein with a vertically extending central cylindrical space (cylinder) 5a in which a metallic bellows 71 is arranged and an annular recess 5b formed in an upper end surface of the casing 5 concentrically of the space 5a.

Figure 3:
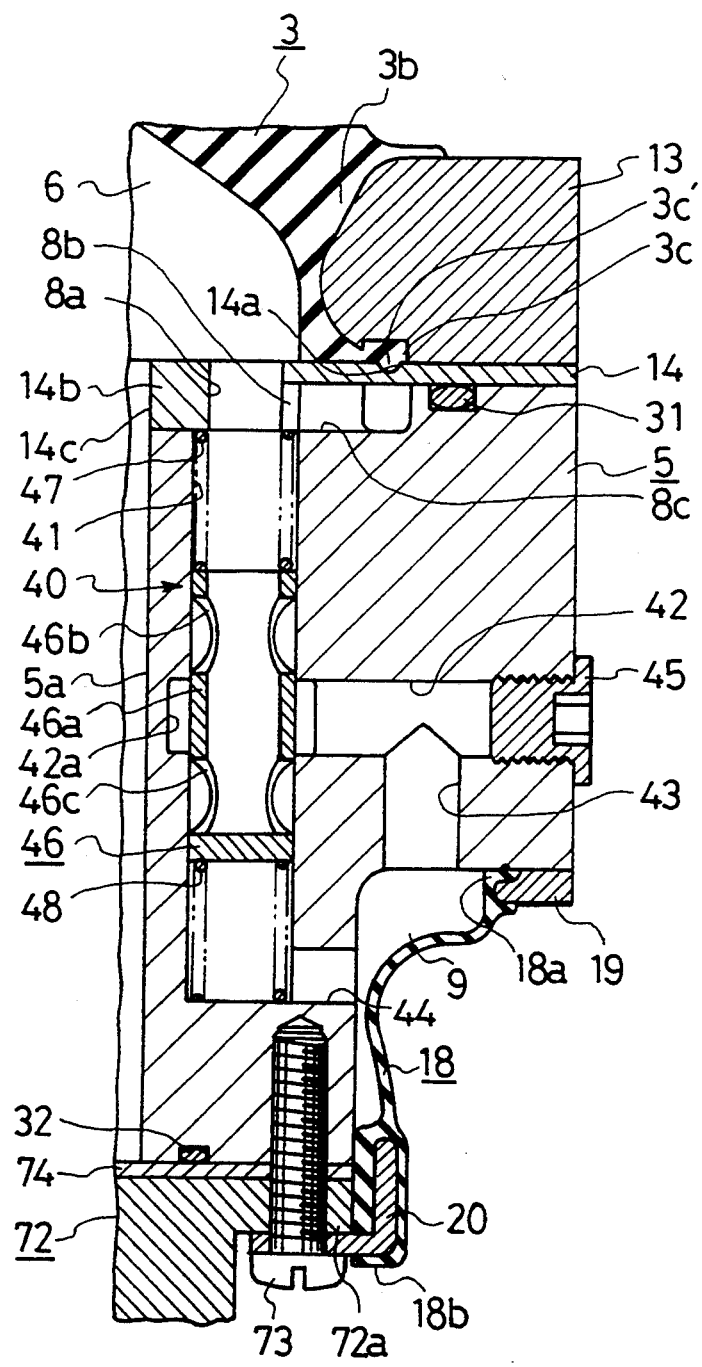
FIG. 3 is a fragmentary sectional view, on an enlarged scale, showing a pressure-relieving mechanism in FIG. 1, in which a valving element is seen to be in a neutral position.

As shown in the FIGS. 1 and 3, the partition plate 14 has an annular thick portion 14b fitted in the annular recess 5b of the casing 5, the thick portion 14b being formed therein with a through bore 14c with a diameter matching that of the cylindrical space 5a. The partition plate 14 is secured to the upper end surface of the lower casing 5 at the thick portion 14b by means of set screws 17.

As shown in FIG. 1, the liquid pressure-changing means 7 is comprised of the aforementioned metallic bellows 71 as a driven member, which is arranged within the cylindrical space 5a of the casing 5, and a voice coil motor (hereinafter simply referred to as "VCM") 70 as electromagnetic driving means for driving the metallic bellows 71.

The VCM 70 has a body 72 arranged on the bottom of the casing 5. The body 72 has an annular flange 72a formed integrally thereon and fixed to a lower end surface 5c of the casing 5 via a partition plate 74, and has an annular space 72b formed in an outer periphery thereof and axially extending from an axially intermediate portion of the body 72 to a lower end face of the body 72. Further, the VCM 70 has an annular permanent magnet 75 secured to an outer wall 72e defining the annular space 72b, a driving element 76 having a bobbin 76a in the form of a hollow cylinder and slidably fitted on an inner wall 72f defining the space 72b such that it can move within the magnetic field generated by the permanent magnet 75, the bobbin 76a having a coil 77 wound around an outer peripheral surface thereof, and a rod 78 slidably fitted through a central through hole 72c axially extending along the axis of the body 72 for transmitting the displacement of the driving element 76 to the metallic bellows 71. The metallic bellows 71 has a lower end 71a thereof secured to an upper end surface of the partition plate 74, and an upper end 71b thereof secured to a lower end surface of a presser plate 79 fixed to an upper end of the rod 78. The partition plate 74 has a central hole 74a formed therethrough for allowing the rod 78 to move therethrough. The central hole 74a has a diameter much smaller than the diametric size of the metallic bellows 71. Thus, the main liquid chamber 6 is defined by the resilient rubber member 3, an inner peripheral surface of the casing 5 defining the cylindrical space 5a, and the partition plate 74.

The VCM 70 having the above described construction operates in such a manner that the coil 77, which is disposed within the magnetic field generated by the permanent magnet 75, is supplied with a control current from the external control means, which is responsive to the engine vibration, so that an electromagnetic driving force is generated in the coil 77 to thereby cause the driving element 76 to be displaced axially of the cylindrical space 5a, reciprocatively or in an oscillating manner. This oscillating displacement of the driving element 76 is transmitted via the rod 78 to the metallic bellows 71 to cause same to expand and contract within the main liquid chamber 6, which causes variation in the liquid pressure within the main liquid chamber 6. When the VCM 70 does not generate any driving force, the metallic bellows 71 is in its neutral position as shown in FIG. 1 due to its own restitution force. Further, when the metallic bellows 71 is extended upward from its neutral position to the highest position, the upper end thereof moves into the upper space 6a of the main liquid chamber 6. The bellows 71 is designed such that its vertical or longitudinal size is substantially larger than its diametrical size, i.e. it is shaped such that it affords a large amount of axial displacement and has a small effective surface area.

The auxiliary liquid chamber 9 is formed by an annular space defined at a lower outer periphery of the casing 5 by a diaphragm 18, which is in the form of an annular band. The diaphragm 18 carries an annular fixture member 19 secured to an upper end 18a thereof, and an annular fixture member 20 having an L-shaped section secured to a lower end 18b thereof. The fixture member 19 is fixed to a lower end surface 5d of the casing 5, which is disposed in contact with the chassis frame 4, by means of set screws 21, while the fixture member 20 is fixed to the casing 5 together with the flange 72a by means of the aforementioned set screws 73. Thus, the diaphragm 18 is supportedly held between the casing 5 and the body 72.

As shown in FIGS. 1 to 3, the restriction passage 8 is formed by a through bore 8a axially extending through the thick portion 14b of the partition plate 14 at an outer periphery of the upper space 6a of the main liquid chamber 6, a bore 8b radially extending from the through bore 8a to an outer peripheral surface of the thick portion 14b, a communicating groove 8c communicating with the bore 8b and radially extending below the partition plate 14 from the bore 8b to a location just above the auxiliary liquid chamber 9, an annular groove 8d circumferentially extending below the partition plate 14 through approximately 270 degrees from a radially outer end of the communicating groove 8c to a terminal end 8d' thereof, and a through hole 8e axially extending through the casing 15 to communicate between the terminal end 8d' and the auxiliary liquid chamber 9.

The resonance frequency of the restriction passage 8, which depends on the cross-sectional area and length of the passage, is set to a very low value (e.g. 7 Hz) lower than a basic vibration frequency (approx. 10 Hz to approx. 100 Hz) of the engine. This enables the liquid to flow via the restriction passage 8 between the main liquid chamber 6 and the auxiliary liquid chamber 9 to thereby keep the pressure within the main liquid chamber 6 substantially constant, only when static pressure is applied to the mount 1 on which the engine as the vibration source is mounted, or when engine vibration occurs, which has a very low vibration frequency, whereby the metallic bellows 71 arranged within the main liquid chamber 6 is held in a neutral position as shown in FIG. 1. On the other hand, when the engine vibration has a higher frequency than the above-mentioned very low value, the restriction passage 8 acts to prevent the liquid from flowing between the main liquid chamber 6 and the auxiliary liquid chamber 9 in response to the vibration of the engine, thus confining variation in the liquid pressure to the inside of the main liquid chamber 6.

Further, as shown in FIGS. 1 and 3, the casing 5 is provided with a pressure-relieving mechanism 40. The pressure-relieving mechanism 40 includes a vertically-extending main bore 41 formed in the upper casing 5 and communicating at an upper end thereof with the through bore 8a, a communicating bore 42 horizontally extending from an intermediate portion of the main bore 41 and opening in an outer peripheral surface of the casing 5, a communicating bore 43 communicating between the communicating bore 42 and the auxiliary liquid chamber 9, and a communicating bore 44 communicating between a lower portion of the main bore 41 and the auxiliary liquid chamber 9. The communicating bore 42 has an open end thereof closed by a blank plug 45 screwed therein. A valving element 46 is slidably received in the main bore 41. The valving element 46 is in the form of a hollow cylinder having an upper open end on the main liquid chamber 6 side and a lower closed end. The valving element 46 has an intermediate portion thereof formed with a closing portion 46a which has a width sufficient to close an inlet opening 42a of the communicating hole 42, and communicating openings 46b, 46c on opposite sides of the closing portion 46a. Arranged on opposite sides of the valving element 46 are a pair of springs 47, 48 urging the valving element toward a neutral position (as shown in FIG. 3) in which the closing portion 46a closes the communicating hole 42.

Further, as shown in FIGS. 1 and 3, an O ring 31 is mounted in the upper end surface of the casing 5 to seal between contact surfaces of the lower casing 5 and the partition plate 14, at a location radially outward of the annular groove 8d of the restriction passage 8. Further, an O ring 32 is mounted in the lower end surface 5c of the casing 5 to seal between contact surfaces of the casing 5 and the partition plate 74, at a location radially outward of the cylindrical space 5a.

The self-expanding engine mounts 1 constructed as above are arranged, e.g. as shown in FIG. 6, at front and rear portions of the engine E in a power unit to support the front and rear portions of the engine E on the chassis frame 4. The coil 77 of the VCM 70 of each engine mount 1 is supplied with a control signal current via a lead 55 shown in FIGS. 1 and 3 from a corresponding controller 51. Inputs of the controllers 51 are connected to an output of an electronic control unit (hereinafter referred to as "the ECU") 50. The ECU 50 is supplied from the engine E with various parameter signals related to the vibration of the engine, such as a signal indicative of the engine rotational speed, based on which the ECU 5 supplies control commands to the controllers 51 in response to the engine vibration.

Next, the operation of the self-expanding engine mount 1 constructed as above according to the first embodiment will be described.

When the ECU 50 detects engine vibration, it supplies a control command for controlling the engine vibration to each controller 51, which in turn supplies a control signal current commensurate with the control command to the coil 77 of the VCM 70 of each engine mount. Accordingly, the driving element 76 of each VCM 70 is alternately displaced upward and downward, i.e. axially of the cylindrical space 5a by a magnetic driving force generated within the coil as the latter is energized and deenergized, in the magnetic field formed by the permanent magnet 75, by the control signal current. The oscillating displacement of the driving element 76 is transmitted via the rod 78 to the metallic bellows 71 to cause alternate contraction and expansion of the bellows 71 about its neutral position shown in FIG. 1, within the main liquid chamber 6. The alternate contraction and expansion of the bellows 71 causes a variation in the pressure of the liquid within the main liquid chamber 6 to thereby resiliently deform the resilient rubber member 3 upward and downward to alternately expand and contract same. The direction of this deformation of the resilient rubber member 3 is such that when the engine E presses down the mount 1 or the resilient rubber member 3, the latter is resiliently deformed downward to contract, whereas when the engine E pulls up the mount 1 or the resilient rubber member 3, the resilient rubber member 3 is resiliently deformed upward to expand. Thus, the alternate contraction and expansion of the resilient rubber member 3 prevents the engine vibration from being transmitted to the chassis frame 4, i.e. to the chassis of the vehicle.

Figure 5:
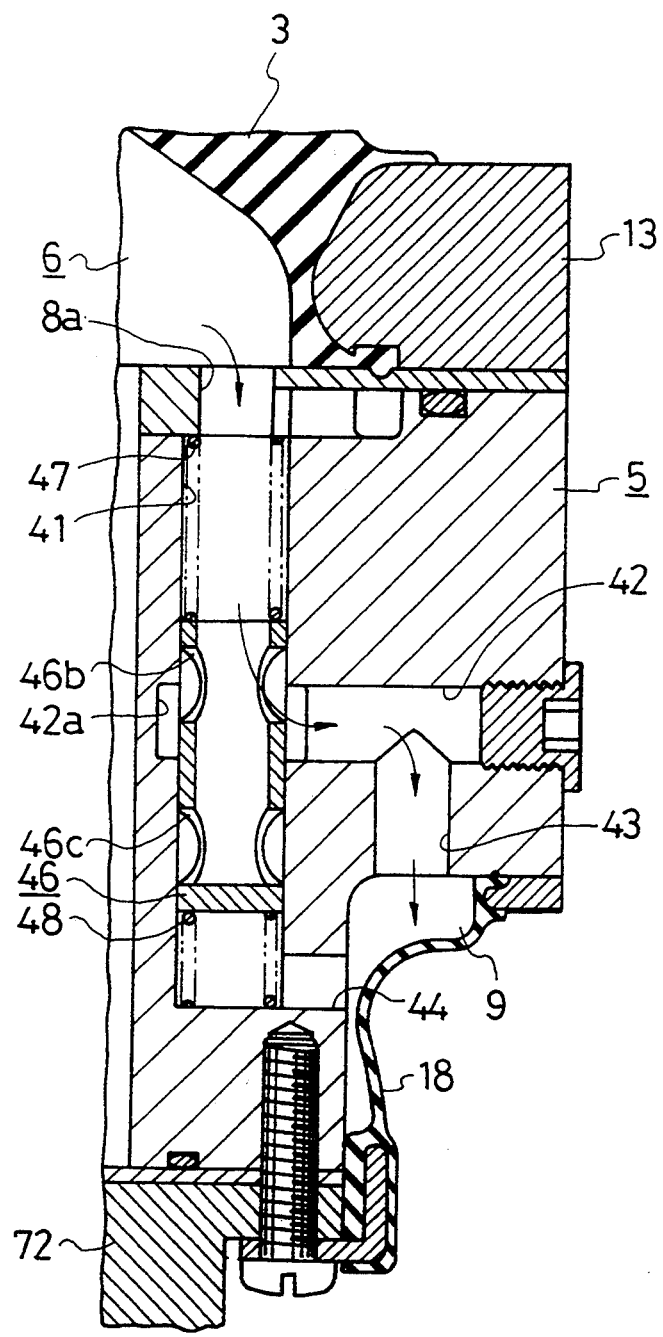
FIG. 5 is a sectional view similar to FIG. 3, showing the valving element in a position in which it is downwardly displaced from the neutral position.

Further, according to the first embodiment, the pressure-relieving mechanism 40 operates as follows: When the liquid pressure within the main liquid chamber 6 is pressurized above a predetermined value, the valving element 46 of the pressure-relieving mechanism 40 is downwardly displaced from its neutral position shown in FIGS. 1 and 3, as viewed in the figures, into a position shown in FIG. 5, to allow the upper opening 46b to communicate with the inlet opening 42a of the communicating hole 42, whereby, as indicated by the arrow in FIG. 5., liquid flows or escapes from the main liquid chamber 6 via the communicating hole 8a, the main bore 41, the inside of the valving element 46, the upper opening 46b of the valving element 46, and the communicating holes 42 and 43, into the auxiliary liquid chamber 9, which prevents an excessive change in the pressure within the main liquid chamber 6 to thereby protect the metallic bellows 71 and the VCM 50. The liquid having flowed into the auxiliary liquid chamber 9 is returned to the main liquid chamber 6 by the restitution force of the diaphragm 18, after the valving element 46 has returned to its neutral position shown in FIG. 1, which enables to maintain the pressure within the main liquid chamber 6 at a substantially constant value. This holds the metallic bellows 51 in its neutral position shown in FIG. 1.

Figure 4:
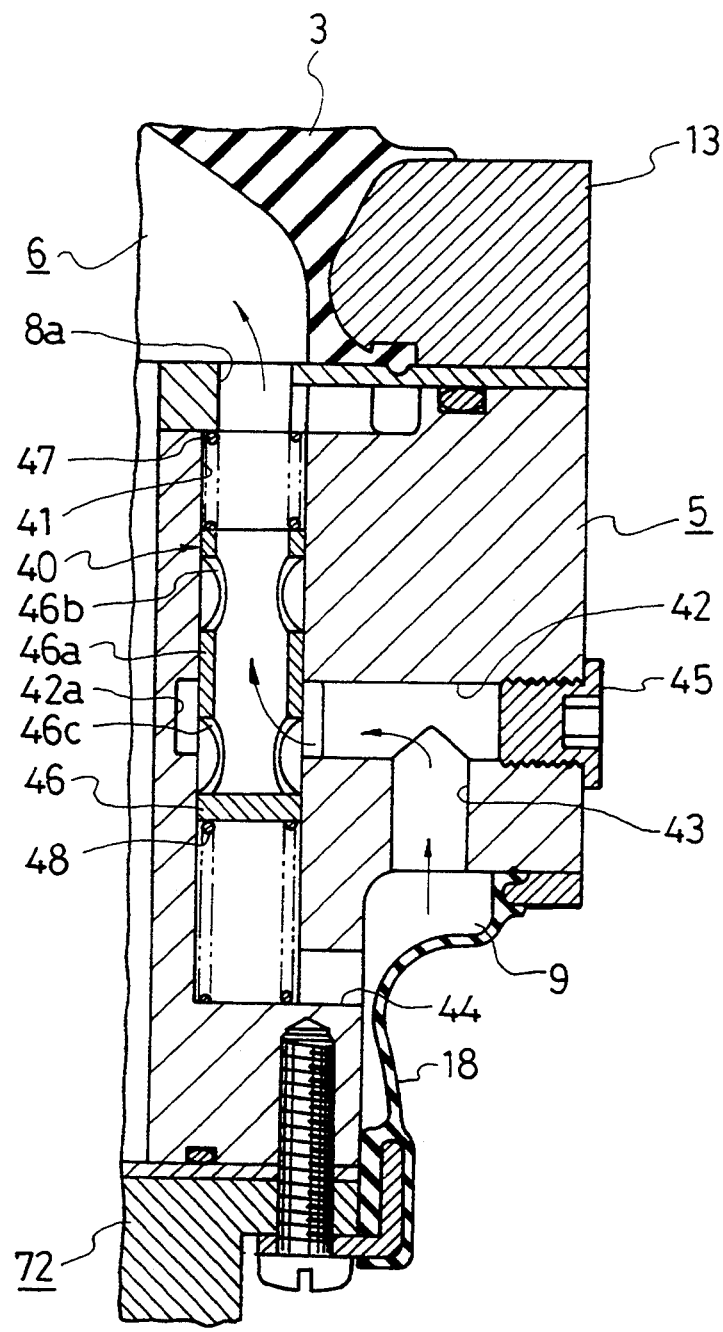
FIG. 4 is a sectional view similar to FIG. 3, showing the valving element in a position in which it is upwardly displaced from the neutral position.

Conversely, when the liquid pressure within the main liquid chamber 6 is negatively pressurized below a predetermined value, the valving element 46 of the pressure-relieving mechanism 40 is upwardly displaced from its neutral position into a position shown in FIG. 4, to allow the lower opening 46c of the valving element 46 to communicate with the inlet opening 42a of the communicating hole 42, so that, as indicated by the arrow in FIG. 4, fluid flows from the auxiliary liquid chamber 9 via the communication holes 43, 42, the lower opening 46c, the inside of the valving element 46, the main bore 41 and the communicating hole 8a, into the main liquid chamber 6, which prevents an excessive change in the liquid pressure within the main liquid chamber 6, to thereby protect the metallic bellows 71 and the VCM 70. In this case as well, the liquid having flowed into the main liquid chamber 6 is returned via the restriction passage 8 the auxiliary liquid chamber 9 by the restitution force of the diaphragm 18, after the valving element 46 has returned to its neutral position, which enables to maintain the pressure within the main liquid chamber 6 at a substantially constant value. This holds the metallic bellows 71 in its neutral position shown.

According to the first embodiment described above, the driving element 76 of the VCM 70 is reciprocatively displaced axially of the cylindrical space 5a by a driving force generated in the coil 77 disposed in the magnetic field of the permanent magnet 75 in response to a control signal current supplied thereto from the external control means. The displacement of the driving element 76 is transmitted through the rod 78 to the metallic bellows 71 to cause same to alternately contract and expand about the neutral position shown in FIG. 1 within the main liquid chamber 6. Therefore, the metallic bellows 71 as the driven member can have a large stroke of contraction and expansion, i.e. a large amount of displacement, thereby enabling to vary the liquid pressure within the main liquid chamber 6 with a large amplitude. This enables to alternately displace upward and downward the resilient rubber member 3 fixed to the bracket 2 on the engine side with a large amplitude, thereby accurately and effectively controlling low frequency vibrations of the engine, having large amplitude.

According to the first embodiment, as the driven member reciprocatively displaceable axially of the cylindrical space 5a within the main liquid chamber 6, the metallic belows 71 is employed, which has a vertical or longitudinal size much larger than its diametric size so that it can have a large amount of axial displacement and a small effective surface area. As a result, the metallic bellows 71 can have a large total amount of displacement even with a small driving force, i.e. a small output from the VCM 70. Thus, the metallic bellows 71 per se has a structure enabling to obtain a large total amount of displacement, which also contributes to increase of the amplitude of variation of the liquid pressure within the main liquid chamber 6 and hence increase of the amplitude of contraction and expansion of the resilient rubber member 3 fixed to the bracket 2 on the engine side.

Further, according to the first embodiment, when the metallic bellows 71 is extended upward from its neutral position shown in FIG. 1 into the highest position, its upper end portion can move into the upper space 6a of the main liquid chamber 6, which also contributes to increase of the amplitude of variation of the liquid pressure within the main liquid chamber 6.

Next, a second embodiment of the invention will be described with reference to FIG. 7.

The self-expanding mount 1 according to the second embodiment employs a piston 710 as the driven member, in place of the metallic bellows 71 employed in the first embodiment described above.

The piston 710 is slidably received within the cylindrical space 5a. The piston 710 has a flat upper end surface 710a facing the upper space 6a of the main liquid chamber 6, and an annular recess 710b opening in the direction of the VCM 70. The annular recess 710b has a large volume for reducing the weight. The piston 710 is secured to an upper end of the rod 78 by means of a set screw 711. A lower space 6b is defined within the cylindrical space 5a at a lower side of the piston 710 and communicated with the auxiliary liquid chamber 9 via a communicating hole 712 formed in the casing 5.

Figure 7:
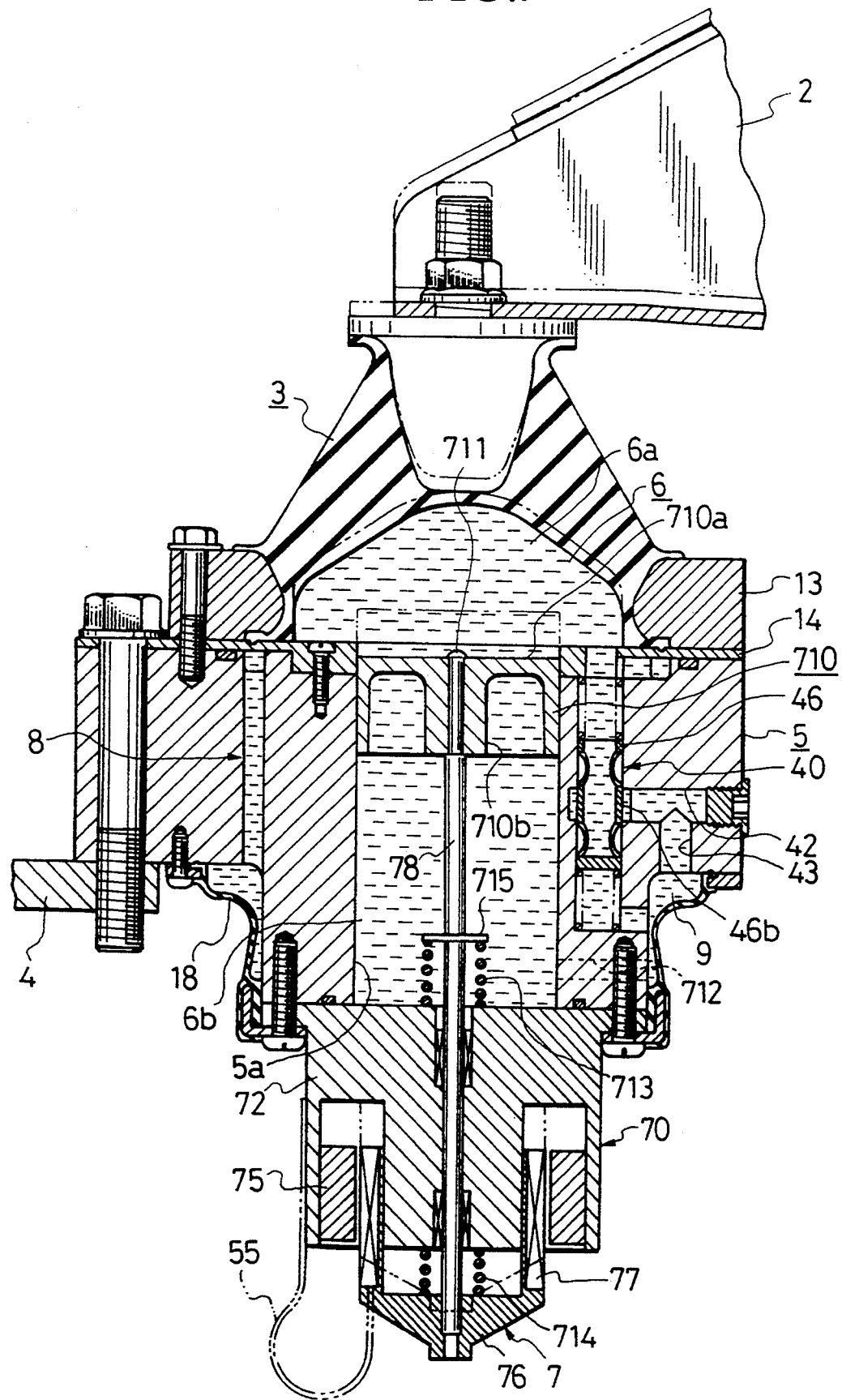
FIG. 7 is a longitudinal cross-sectional view showing a self-expanding mount for an engine according to a second embodiment of the invention.

The piston 710 is normally biased in a neutral position shown in FIG. 7 by a pair of coiled springs 713 and 714.

The upper coiled spring 513 is interposed between an upper end surface of the body 72 of the VCM 50 and a spring seat 515 secured to the rod 78, and the lower coiled spring 514 is interposed between an inner wall of the driving element 76 and a lower end surface of the body 72.

In the self-expanding mount 1 constructed as above, similarly to the first embodiment described above, a control signal current corresponding to engine vibration is applied to the coil 77 of the VCM 70, so that a magnetic driving force corresponding to the engine vibration is generated in the coil 77 disposed in the magnetic field formed by the permanent magnet 75, to cause the driving element 76 to be reciprocatively displaced axially of the cylindrical space 5a. This displacement of the driving element 76 is transmitted via the rod 78 to the piston 710 to cause same to be reciprocatively displaced about its neutral position shown in FIG. 7 to thereby cause a variation in the liquid pressure within the main liquid chamber 6 and hence cause resilient deformation of the resilient rubber member 3 in the upward and downward directions. Thus, the engine vibration is prevented from being transmitted to the chassis frame 4, i.e. to the vehicle chassis.

Next, a third embodiment of the invention will be described with reference to FIGS. 8 and 9.

The self-expanding engine mount 1 according to the third embodiment is distinguished from the first and second embodiments described above in that the liquid pressure-changing means 7 is arranged within the cylindrical space 5a, and part of the electromagnetic driving means of the liquid pressure-changing means 7 is formed integrally on a piston 710A corresponding to the piston 710 employed in the second embodiment.

Figure 8:
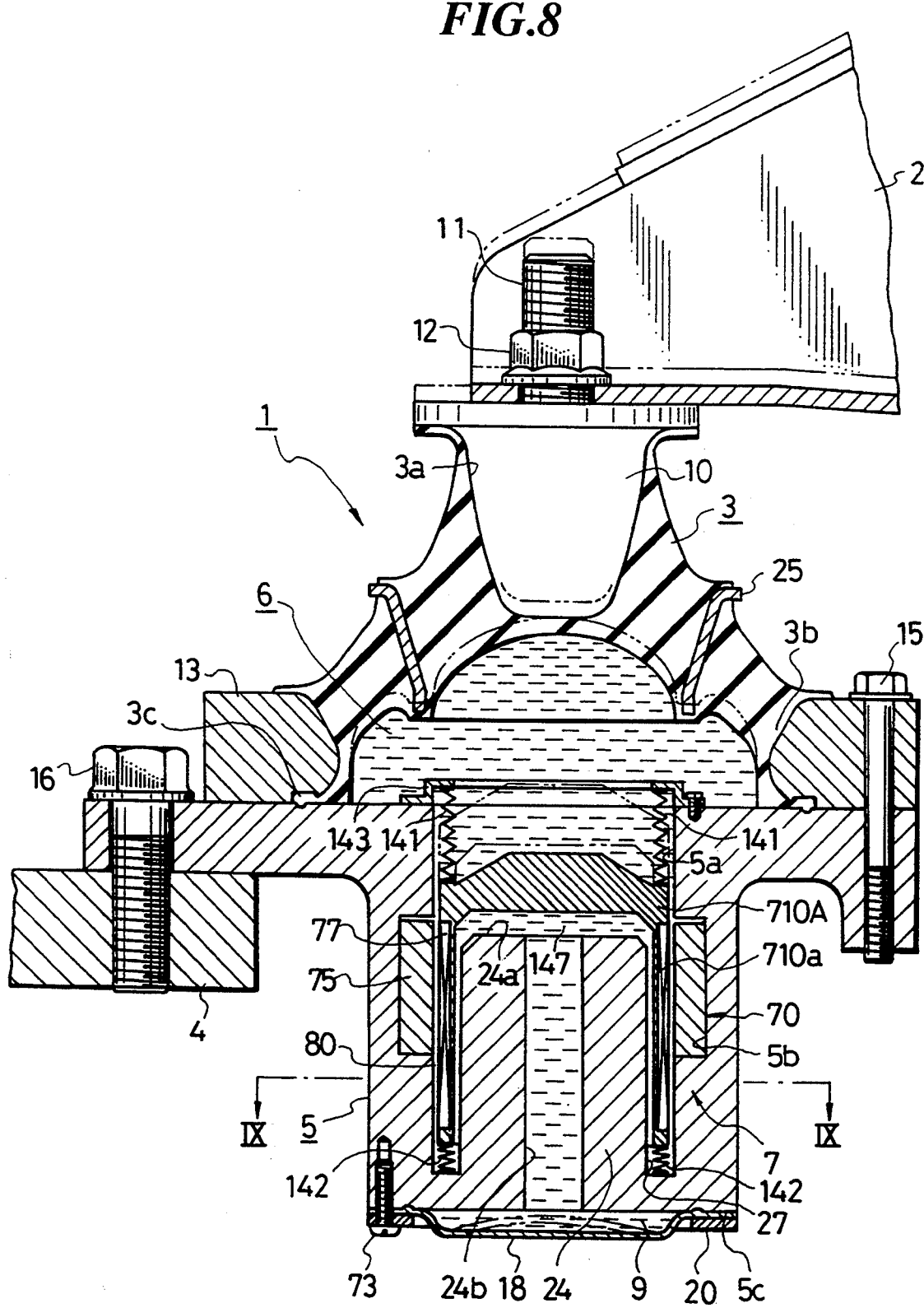
FIG. 8 is a longitudinal cross-sectional view showing a self-expanding mount for an engine, according to a third embodiment of the invention.
Figure 9:
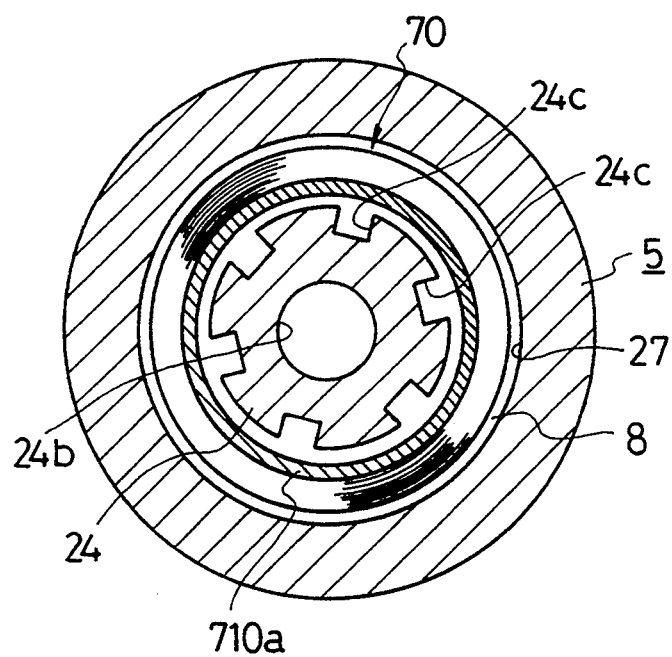
FIG. 9 is a sectional view taken along line IX—IX in FIG. 8.

As shown in FIG. 8, the resilient rubber member 3 in this embodiment is designed such that it is larger in radius than the resilient rubber member 3 of the above described embodiments, and hence it affords a larger amount of contraction and expansion in response to variation in the liquid pressure within the main liquid chamber 6. Further, to compensate for reduced strength thereof due to the increased radius, an annular reinforcing member 25 is embedded in an radially intermediate portion of the resilient rubber member 3.

As shown in FIG. 8, a cylindrical portion 24 is formed within the cylindrical space 5a of the casing 5, with its horizontal upper end surface 24a located at a middle portion of the space 5a. Defined between an outer peripheral surface of the cylindrical portion 24 and an inner peripheral surface of the cylindrical space 5a is an annular space 27 which is closed at its lower end and communicates with a space within the cylindrical space 5a defining part of the main liquid chamber 6 via an upper open end thereof. Further, the cylindrical portion 24 has a central through hole 24b axially formed therethrough, and a plurality of axially extending deep grooves 24c formed in an outer peripheral surface thereof, which are shown in FIG. 9.

The liquid pressure-changing means 7 is comprised of the aforesaid piston 710A slidably received within the cylindrical space 5a, and the VCM 70 as electromagnetic driving means arranged within the casing 5 for reciprocatively displacing the piston 710A axially of the cylindrical space 5a in response to engine vibration. The piston 710A has a bobbin 710a in the form of a hollow cylinder integrally formed thereon and slidably received in the annular space 27.

The VCM 70 is comprised of an annular permanent magnet 75 securedly fitted in an annular groove 5b formed in an inner peripheral wall of the casing 5 defining the cylindrical space 5a, and a coil 77 wound around an outer peripheral surface of the bobbin 710a. The piston 710A per se forms the driving element of the VCM 70.

The piston 710A is normally held in a neutral position, while floating within the main liquid chamber 6, by coiled springs 141, 142 arranged at upper and lower ends thereof, respectively, for urgingly holding the piston 710A in the neutral position. FIG. 8 shows the lowest position of the piston 710A, in which the lower spring 142 is compressed to the maximum degree. The upper spring 141 is interposed between an annular spring holder 143 secured to an upper end surface of the casing 5 and an upper end surface of the piston 710A. The lower spring 142 is interposed between a lower end surface of the bobbin 710a and a bottom surface of the annular space 27.

Further, the auxiliary liquid chamber 9 is defined between a lower end surface 5c of the lower casing 5 and a diaphragm 18. The diaphragm 18 has a peripheral edge thereof sandwiched between an annular fixture member 20 and the lower end surface 5c of the casing 5 and secured to the casing 5 by a plurality of set screws 73. The auxiliary liquid chamber 9 communicates with the main liquid chamber 6 via a communication passage formed of the central through hole 24b of the cylindrical portion 24, a space 147 defined between the upper end surface 24a of the cylindrical portion 24 and the piston 710A, a space defined between the outer peripheral surface of the cylindrical portion 24 and the bobbin 710a, and a space 80 defined between an outer peripheral surface of the piston 710A including an outer peripheral surface of the coil 77 and the wall of the casing 5 defining the cylindrical space 5a. The space 80 corresponds to the restriction passage 8 of the first and second embodiments and has the same function with that of the latter.

The self-expanding mount 1 according to the third embodiment constructed as above is mounted onto a chassis of a vehicle, not shown, in a similar manner to the first embodiment, and similarly connected to the ECU 50 in FIG. 3.

With the above arrangement according to the third embodiment, similar to the second embodiment described before, the piston 710A is reciprocatively displaced upward and downward by a magnetic driving force generated in the coil 77 disposed in the magnetic field of the permanent magnet 75 in response to a control signal current supplied thereto. The displacement of the piston 710A causes a change in the liquid pressure within the main liquid chamber 6, to thereby cause alternate upward and downward deformation of the resilient rubber member 3 for contraction and expansion in response to engine vibration. This contraction and expansion prevents transmission of the engine vibration to the chassis.

According to the third embodiment, similar to the second embodiment, the piston 710A is reciprocatively displaced axially of the cylindrical space 5a by the VCM 70 as the electromagnetic driving means in response to engine vibration. The piston 710A can have a large amount of displacement, enabling to vary the liquid pressure within the main liquid chamber 6 with a large amplitude to thereby accurately and effectively control engine vibrations in a low frequency region, which are large in amplitude.

Further, according to the third embodiment, the piston 710A per se forms the driving element of the VCM 70 as part of the liquid pressure-changing means 7 in such a manner that it is displaced in an oscillating manner within the cylindrical space 5a, together with the coil 77 integral with the piston 710A, by a magnetic driving force generated in the coil 77 disposed in the magnetic field formed by the permanent magnet 75. Therefore, it dispenses with the driving element 76 of the VCM 70, the metallic bellows 71, the rod 78 connecting the driving element 76 to the piston 710, and other members associated therewith, which are employed in the second embodiment. This simplified construction of the liquid pressure-changing mechanism enables to reduce the number of component parts, saving the manufacturing cost, and reduce the total size and weight of the liquid pressure-changing means 7, which in turn enables to reduce the amount of the control signal current inputted to the coil 77 for driving the piston 710A as the driving element, thus saving the electric power. The reduction of the total mass of the liquid pressure-changing means 7 contributes to reducing the total size and weight of the engine mount 1.

Further, since the whole liquid pressure-changing means 7 is accommodated within the casing 5, the vertical size of the engine mount 1 can be reduced to make the whole mount 1 compact in size, reducing the total space occupied by the engine mount 1.

The reduction of the total mass of the engine mount 1 and the total space occupied by same leads to improvement of the mountability of the engine mount 1 onto the vehicle.

Further, according to the third embodiment, the spacing 80 defined between the outer peripheral surface of the piston 710A including the outer peripheral surface of the coil 77 and the inner peripheral surface of the cylindrical space 5a forms a restriction corresponding to the restriction passage 8 of the first embodiment, as mentioned above. Therefore, it is not necessary to provide a special path which serves as restricting means for restricting the flow of liquid, i.e. the restriction passage 8, as in the first embodiment, which enables to simplify the machining operation, as well as to simplify the construction, and reduce the total space occupied by the mount 1 and the mass of same.

Furthermore, according to the third embodiment, when the liquid pressure within the main liquid chamber 6 excessively rises, part of the liquid within the chamber 6 escapes into the space 147 between the upper end surface 24a of the cylindrical portion 24 and the lower side surface of the piston 710A, which prevents sudden downward movement of the piston 710A. This can dispense with the pressure-relieving mechanism 40 employed in the first and second embodiments, also contributing to simplification of the construction of the mount 1.

What is claimed is:

1. A self-expanding mount for controlling transmission of vibration of a vibration source to a base, including a resilient member fixed to one of said vibration source and said base, a casing fixed to the other of said vibration source and said base, a main liquid chamber defined between said resilient member and said casing and filled with liquid, liquid pressure-changing means for changing pressure of said liquid within said main liquid chamber in response to a control signal corresponding to vibration of said vibration source, an auxiliary liquid chamber, and a communication passage having a restriction and communicating said auxiliary liquid chamber with said main liquid chamber, wherein a variation in pressure of said liquid is caused by said liquid pressure-changing means to cause contraction and expansion of said resilient member to thereby control the transmission of vibration from said vibration source to said base, the improvement wherein said liquid pressure-changing means comprises a cylinder formed in said casing and defining part of said main liquid chamber, a driven member received in said cylinder for axial displacement therein, and electromagnetic driving means for driving said driven member, and wherein said communication passage includes pressure-relieving means for allowing liquid from one of said main liquid chamber and said auxiliary liquid chamber to the other when an excessive change occurs in the pressure of liquid within said main liquid chamber.

2. A self-expanding mount as claimed in claim 1, wherein said electromagnetic driving means comprises a permanent magnet arranged below said casing, a driving element disposed in a magnetic field formed by said permanent magnet and displaceable axially of said cylinder, a coil wound on said driving element and disposed to be supplied with said control signal corresponding to vibration of said vibration source, and a transmitting member disposed to transmit displacement of said driving element to said driven member.

3. A self-expanding mount as claimed in claim 1 or 2, wherein said driven member comprises a bellows.

4. A self-expanding mount as claimed in claim 3, wherein said bellows has an axial size substantially larger than a diametric size thereof.

5. A self-expanding mount as claimed in claim 1 or 2, wherein said driven member comprises a piston.

6. A self-expanding mount as claimed in claim 1 or 2 wherein said auxiliary chamber is formed in part by a diaphragm having an elastic restitution force.

7. A self-expanding mount as claimed in claim 1, wherein said driven member of said liquid pressure-changing means comprises a piston slidably received in said cylinder, said electromagnetic driving means being arranged within said casing for causing oscillating displacement of said piston in an axial direction of said cylinder in response to vibration of said vibration source.

8. A self-expanding mount as claimed in claim 7, wherein said cylinder has an inner peripheral surface, said electromagnetic driving means comprising a permanent magnet arranged in said inner peripheral surface of said cylinder, and a coil wound on a portion of said piston located within a magnetic field formed by said permanent magnet, said coil being disposed to be supplied with said control signal corresponding to vibration of said vibration source.

9. A self-expanding mount as claimed in claim 8, wherein said casing has a cylindrical portion located in said cylinder at a side remote from said main liquid chamber, said cylindrical portion having such a size and arrangement that an annular space is defined between an outer peripheral surface of said cylindrical portion and an inner peripheral surface of said cylinder, said annular space having a closed end, and another end communicating with a space defined within said cylinder and forming part of said main liquid chamber, said portion of said piston having said coil wound thereon being received in said annular space.

10. A self-expanding mount for controlling transmission of vibration of a vibration source to a base, including a resilient member fixed to one of said vibration source and said base, a casing fixed to the other of said vibration source and said base, a main liquid chamber defined between said resilient member and said casing and filled with liquid, liquid pressure-changing means for changing pressure of said liquid within said main liquid chamber in response to a control signal corresponding to vibration of said vibration source, an auxiliary liquid chamber, and a communication passage having a restriction and communication said auxiliary liquid chamber with said main liquid chamber, wherein a variation in pressure of said liquid is caused by said liquid pressure-changing means to cause contraction and expansion of said resilient member to thereby control the transmission of vibration from the vibration source to said base, the improvement wherein said liquid pressure-changing means comprises a cylinder formed in said casing and defining part of said main liquid chamber, a driven member received in said cylinder for axial displacement therein, and electromagnetic driving means for driving said driven member, said driven member comprising a bellows.

11. A self-expanding mount as claimed in claim 10, wherein said electromagnetic driving means comprises a permanent magnet arranged below said casing, a driving element disposed in a magnetic field formed by said permanent magnet and displaceable axially of said cylinder, a coil wound on said driving element and disposed to be supplied with said control signal corresponding to vibration of said vibration source, and a transmitting member disposed to transmit displacement of said driving element to said driven member.

12. A self-expanding mount as claimed in claim 10 or 11, wherein said bellows has an axial size substantially larger than a diametric size thereof.

13. A self-expanding mount as claimed in claim 10 or 11, including pressure-relieving means connected to said communication passage for allowing liquid from one of said main liquid chamber and said auxiliary liquid chamber to the other when an excessive change occurs in the pressure of liquid within said main liquid chamber.

14. A self-expanding mount as claimed in claim 10 or 11, wherein said auxiliary chamber is formed in part by a diaphragm having an elastic restitution force.

15. A self-expanding mount as claimed in claim 14, wherein said bellows has an axial size substantially larger than a diametric size thereof.

16. A self-expanding mount as claimed in claim 15, including pressure-relieving means connected to said communication passage for allowing liquid from one of said main liquid chamber and said auxiliary liquid chamber to the other when an excessive change occurs in the pressure of liquid within said main liquid chamber.

17. A self-expanding mount as claimed in claim 16, wherein said auxiliary chamber is formed in part by a diaphragm having an elastic restitution force.

* * * * *